(12) United States Patent
Hamersley

(10) Patent No.: US 8,139,460 B2
(45) Date of Patent: Mar. 20, 2012

(54) HIGH-SPEED MULTI-LAYER OPTICAL DISC RECORDING

(75) Inventor: Alan Bruce Hamersley, Newbury Park, CA (US)

(73) Assignee: Thomson Licensing, Boulogne-Billcourt (FR)

( * ) Notice: Subject to any disclaimer, the term of this patent is extended or adjusted under 35 U.S.C. 154(b) by 670 days.

(21) Appl. No.: 12/308,599

(22) PCT Filed: Jan. 12, 2007

(86) PCT No.: PCT/US2007/000890
§ 371 (c)(1),
(2), (4) Date: Dec. 18, 2008

(87) PCT Pub. No.: WO2007/130162
PCT Pub. Date: Nov. 15, 2007

(65) Prior Publication Data
US 2011/0182162 A1     Jul. 28, 2011

Related U.S. Application Data

(60) Provisional application No. 60/815,631, filed on Jun. 21, 2006.

(51) Int. Cl.
*G11B 7/00* (2006.01)
(52) U.S. Cl. ........................ 369/94; 369/47.28
(58) Field of Classification Search ............ 369/94, 369/44.37, 59.13, 59.21, 47.19, 47.24, 47.43, 369/275.2, 47.15, 47.28, 47.32
See application file for complete search history.

(56) References Cited

U.S. PATENT DOCUMENTS

| | | | | |
|---|---|---|---|---|
| 5,414,451 A | * | 5/1995 | Sugiyama et al. | 347/258 |
| 5,754,509 A | * | 5/1998 | Miyazaki et al. | 369/53.29 |
| 6,002,655 A | * | 12/1999 | Ono et al. | 369/94 |
| 7,423,952 B2 | * | 9/2008 | Shishido et al. | 369/94 |
| 7,688,704 B2 | * | 3/2010 | Martens et al. | 369/275.3 |
| 7,746,754 B2 | * | 6/2010 | Lee et al. | 369/275.1 |
| 7,773,496 B2 | * | 8/2010 | Hirayama | 369/275.3 |
| 2005/0094532 A1 | * | 5/2005 | Akiyama et al. | 369/94 |
| 2005/0105427 A1 | * | 5/2005 | Cookson et al. | 369/94 |
| 2005/0185542 A1 | * | 8/2005 | Iwase | 369/47.19 |
| 2005/0219986 A1 | * | 10/2005 | Shimada et al. | 369/94 |
| 2008/0165666 A1 | * | 7/2008 | Yeh | 369/275.1 |

FOREIGN PATENT DOCUMENTS

| | | |
|---|---|---|
| EP | 0807929 | 11/1997 |
| EP | 1569218 | 8/2005 |
| JP | 991700 | 4/1997 |
| JP | 2001006256 | 1/2001 |
| KR | 100239362 | 2/2000 |
| KR | 20020006205 | 1/2002 |

OTHER PUBLICATIONS

International Search Report, dated Jun. 21, 2007.

* cited by examiner

*Primary Examiner* — Thang Tran
(74) *Attorney, Agent, or Firm* — Robert D. Shedd; Robert B. Levy; Jeffrey D. Hale

(57) ABSTRACT

An apparatus includes a recorder having at least two optical pickup heads for simultaneously recording at least two bit streams on respective layers of recordable media in one of an opposite track path and a parallel track path.

32 Claims, 4 Drawing Sheets

HIGH-SPEED MULTI-LAYER OPTICAL DISC RECORDING

CROSS-REFERENCE TO RELATED APPLICATIONS

This application claims the benefit, under 35 U.S.C. §365 of International Application PCT/US2007/000890, filed Jan. 12, 2007, which was published in accordance with PCT Article 21(2) on Nov. 15, 2007 in English and which claims the benefit of International patent application No. PCT/US2006/013732, filed Apr. 12, 2006; International patent application No. PCT/US2006/021457, filed Jun. 1, 2006 and U.S. provisional patent application No. 60/815,631, filed Jun. 21, 2006.

FIELD OF THE INVENTION

The present invention generally relates to digital video recording devices and more particularly to a high-speed, multi-layer optical drive.

BACKGROUND OF THE INVENTION

On-demand digital versatile disc DVD manufacturing systems for use in retail environments, centralized fulfillment centers and replication factories require high-speed recording of video content to dual layer DVD recordable media. There are two format types allowed in the DVD Read Only Specifications for dual layer media. In the parallel track path (PTP) case, both layers are recorded and played back from the inner radius toward the outer radius of the disc. In the opposite track path (OTP) case, the layers are recorded and played back in opposite directions with respect to radius. The OTP case allows for continuous playback of content without interruption. Simultaneous recording of both DVD layers utilizing recorders with two optical pickups would greatly improve recording speed and efficiency. This is very difficult to realize because the majority of theatrical or video releases are manufactured on dual layer DVD media recorded in the opposite track path OTP format.

Dual layer DVD opposite track path (OTP) media consists of two layers, layer 0 and layer 1, which are recorded and played back in opposite directions. For recordable media, recording is generally performed in a continuous manner, whereby upon completion of layer 0, the optical pickup will jump to layer 1 and continue the recording process from the same radius, but in the opposite radial direction. In the standard replication process layer 0 masters are recorded from the inside to outside diameter and layer 1 masters are recorded from the outside diameter to the inside diameter. For continuous playback of both layers, the player will first play layer 0 from the inside diameter toward the outside diameter and then the optical pickup head will jump to layer 1 and will seamlessly continue playback of Layer 1 from the outside diameter toward the inside diameter. Direction or rotation sense from the readout side of the disc is the same for both layer 0 and layer 1.

DVD media is recorded and played back in the constant linear velocity (CLV) format. The rotation frequency of the disc for recording and playback processes vary as a function of the radius. This makes it very inconvenient to record both layers simultaneously due to the different rotation frequencies or data rate frequencies required to record layer 0 from inside to outside and to record layer 1 from the outside to inside.

The motion picture and retail industries are looking for a secure means of production of DVD-Video discs that can be produced on-demand from DVD-Video content that is stored on a local server or delivered for central storage server through high speed private networks. This allows for the availability of thousands of DVD-Video titles from a deep catalog of movies that normally could not be easily inventoried in a retail or online store environment. Solutions to support this product segment, however, are only single layer media with a data capacity of 4.7 GB is employed. The data capacity limitation of Single Layer media limits the storage capacity available to store compressed video files and thus limits the video capacity and quality. Furthermore, there is limited storage capacity available for added value features that can be included on product manufactured With the standard DVD-Video replication process. Dual layer media, with its 8.5 GB storage capacity, is highly desired for this purpose because of the high video quality that can be achieved through the use of a high bit-rate. Also, with dual layer media value added features can be included similar to that offered by standard DVD-Video product produced on Dual Layer DVD-9 media.

Higher speed recording is required for an on-demand manufacturing system for both increased throughput and reduced manufacturing cost. For an in-store on-demand replication application, reduced cycle times are desired to improve delivery time to the customer. For single optical pickup recording, dual layer DVD recording can take approximately 15 minutes. Known multiple optical heads in optical disc storage devices use the multiple heads in a non-synchronized manner to improve data recording and retrieval rates and for improved data access time for the device. However, a faster recording time is needed to attract consumer use of in-store, on-demand replication services.

SUMMARY OF THE INVENTION

In one aspect of the invention, there is an apparatus that includes a recorder having at least two optical pickup heads for simultaneously recording at least two bit streams on respective layers of recordable media in one of an opposite track path and a parallel track path.

In another aspect of the invention, a method includes recording at least two bit streams simultaneously on respective layers of recordable media in one of an opposite track path and a parallel track path.

In a further aspect of the invention, an apparatus includes a recorder having at least two optical pickup heads for simultaneously recording at least two bit streams on respective layers of recordable media in an opposite track path. The at least two bit streams are recorded on distinct layers of the recordable media for playback in opposite directions with respect to a radius of the recordable media.

In a yet further aspect of the invention, a method includes recording at least two bit streams simultaneously on respective layers of recordable media in an opposite track path. Preferably, the recording includes recording one of the two bit streams as a first-in first-out bit stream while the other of the two bit streams is recorded as a first-in last-out bit stream.

BRIEF DESCRIPTION OF THE DRAWINGS

The advantages, nature, and various additional features of the invention will appear more fully upon consideration of the illustrative embodiments now to be described in detail in connection with accompanying drawings wherein.

It should be understood that the drawings are for purposes of illustrating the concepts of the invention and are not necessarily the only possible configuration for illustrating the invention.

DETAILED DESCRIPTION OF THE INVENTION

The invention solves the problem of having to record the two layers of dual layer opposite track path disc sequentially from the inner to outer radius of layer 0 and then recording from the outer radius to the inner radius layer 1. Simultaneous recording of layer 0 and layer 1 is achieved by inverting the order of the data stream that is to be recorded to layer 1. All data and disc rotation timing is synchronized for recording both layers by having both optical pickup heads recording at the same radius for both layers. Data is recorded to both layers simultaneously with the data and disc rotation clocks being synchronized The data streams may be clocked out by a single clock or may be clocked by two synchronized clocks of the same frequency. The rotation frequency clock may be synchronized to the data clocks. Furthermore the disc can be recorded in constant linear velocity (CLV) mode where the data clock frequency remains constant and the rotation clock frequency varies as a function of radius. Alternatively, the disc can be recorded in constant angular velocity (CAV) mode where data clock frequency varies as a function of radius while the rotation clock frequency is constant.

It should be further understood that the elements shown in the Figures may be implemented in various forms of hardware, software or combinations thereof. Preferably, these elements are implemented in a combination of hardware and software on one or more appropriately programmed general-purpose devices, which may include a processor, memory and input/output interfaces.

Figure 1A:
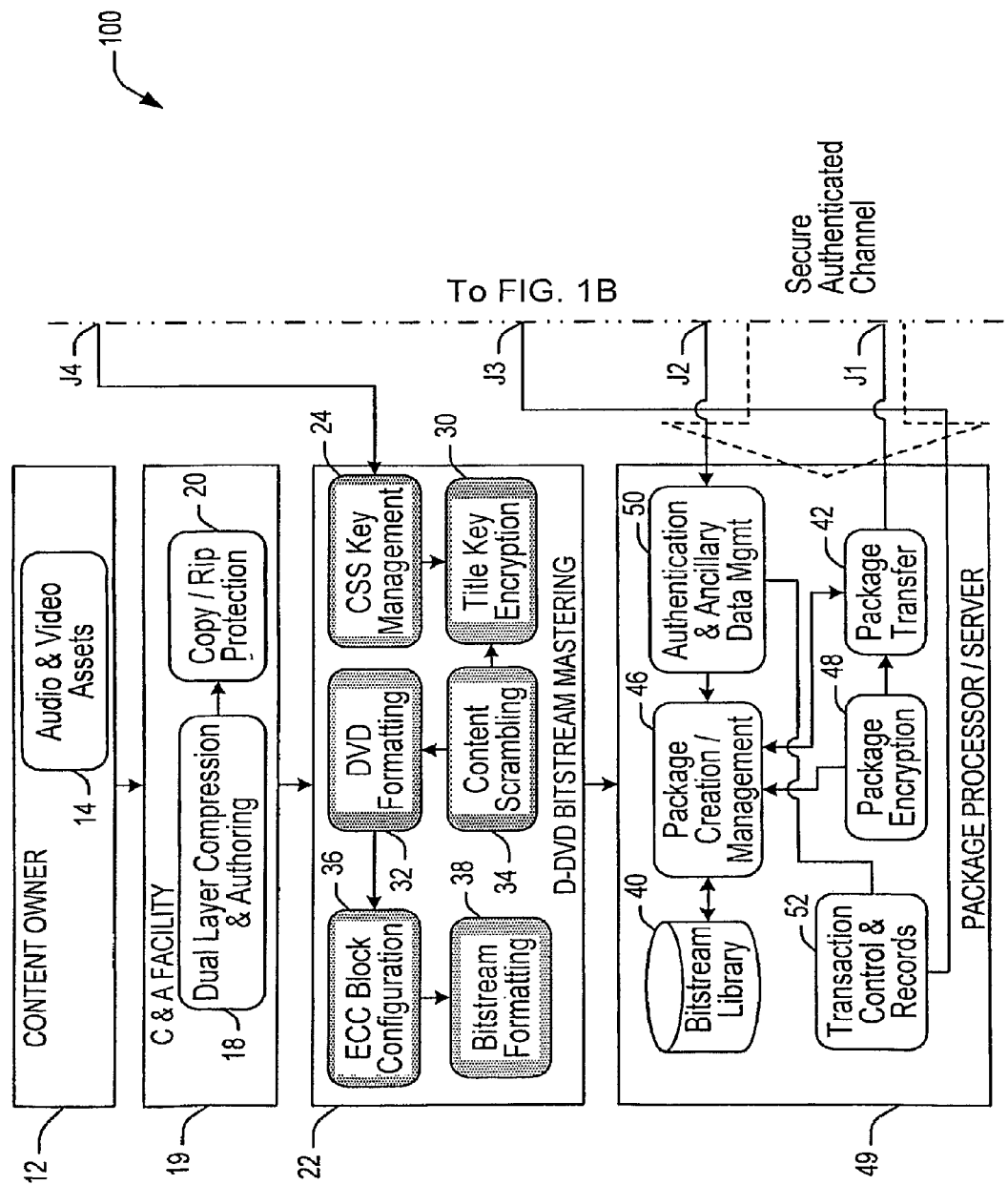
FIG. 1 is a schematic diagram of an inventive high-speed dual layer downloadable D-DVD replication for replicating media objects (e.g.; DVD's) from an exemplary retail establishment.
Figure 1B:
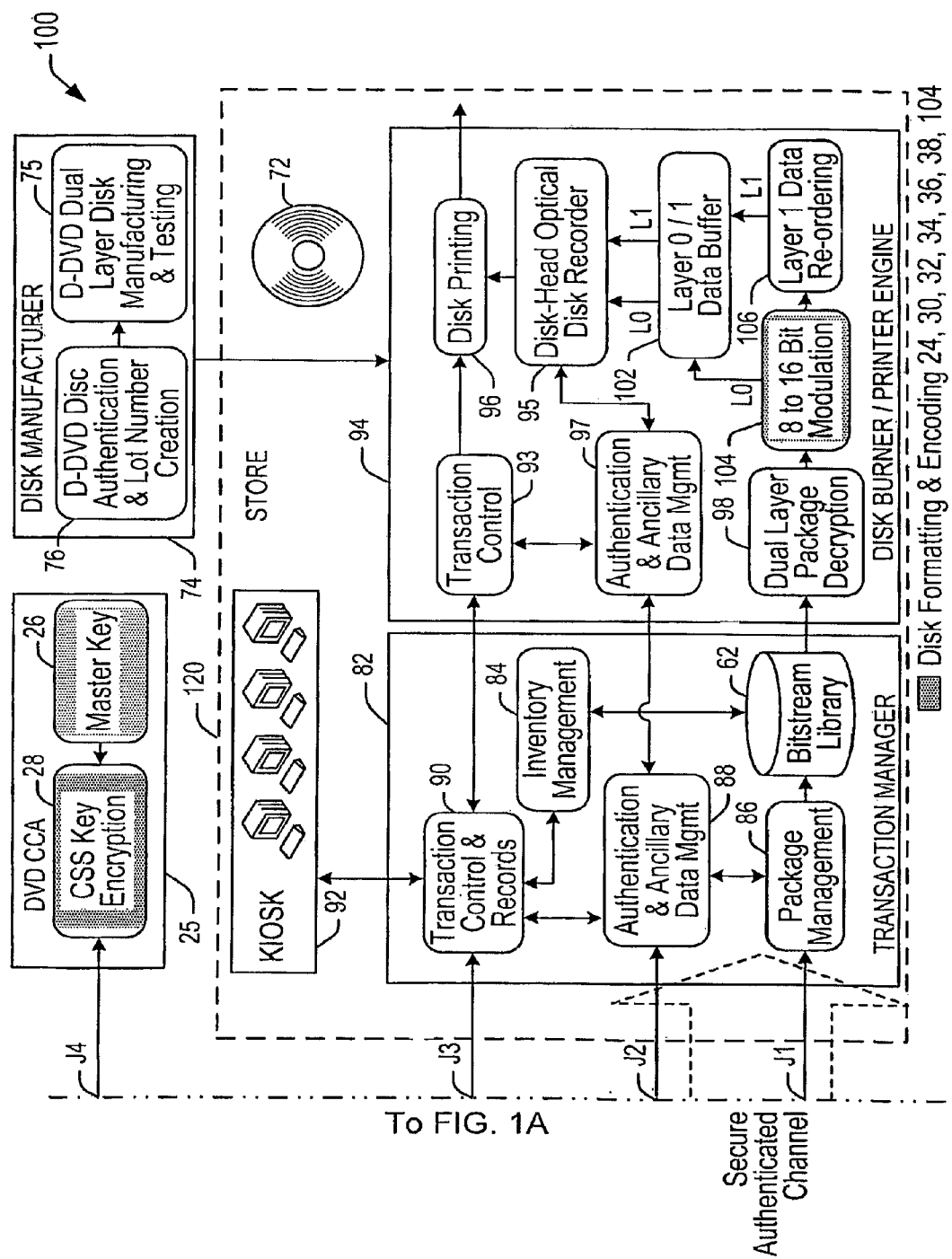
Figure 2:
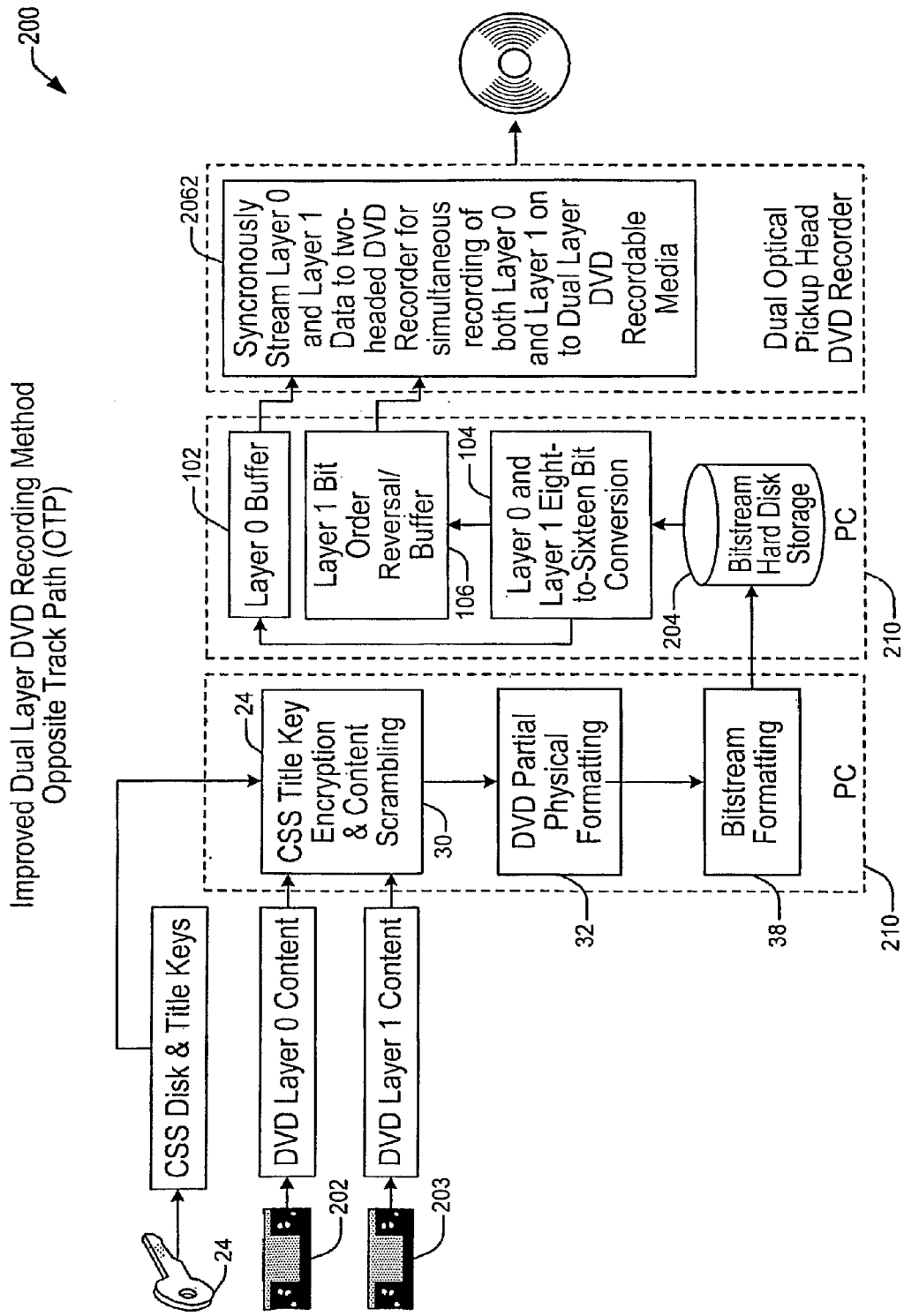
FIG. 2 is block diagram of an exemplary high-speed dual-layer parallel track path (PTP) method in accordance with the present invention.
Figure 3:
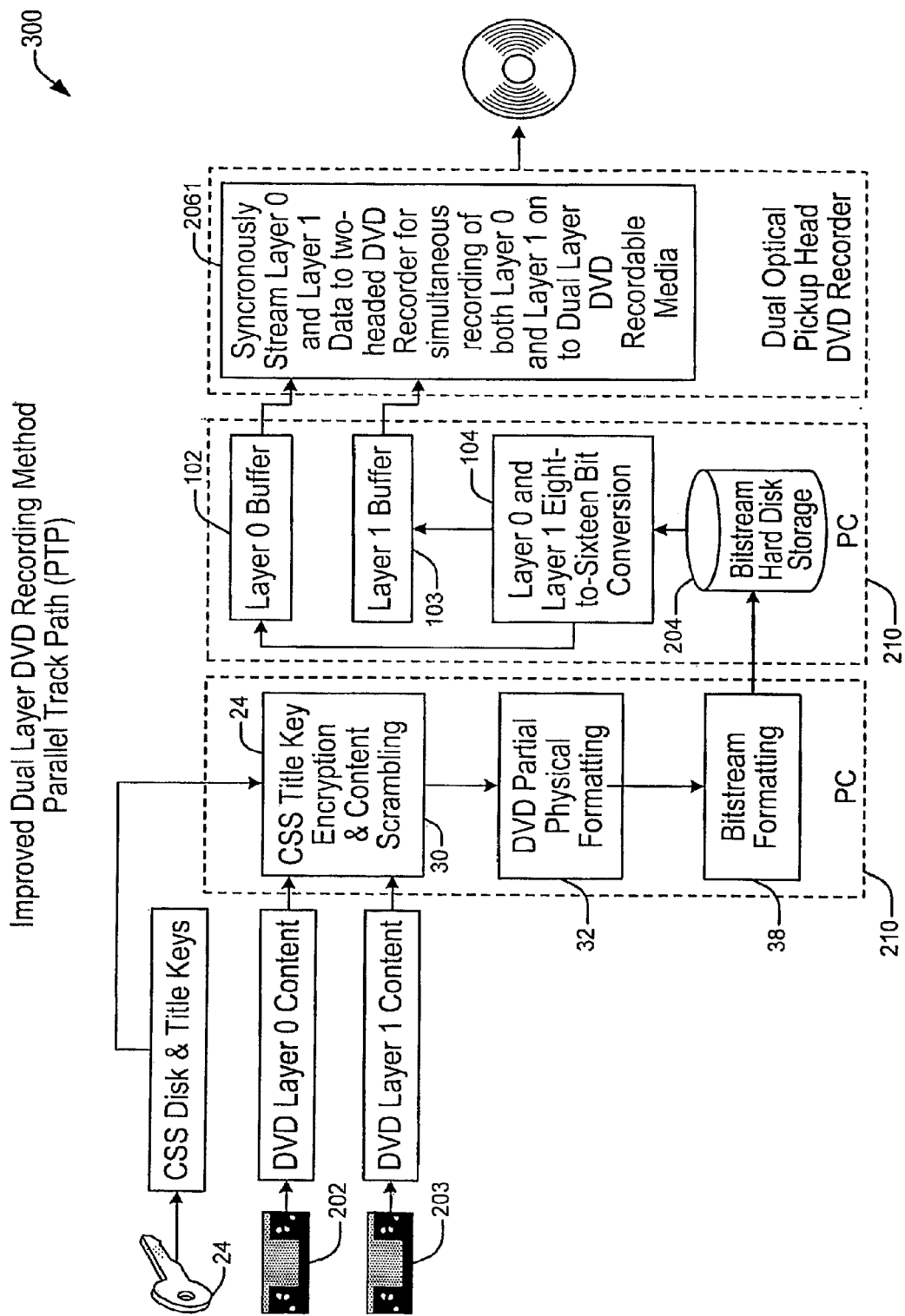
FIG. 3 is block diagram of an exemplary high-speed dual-layer opposite track path (OTP) method in accordance with the present invention.

Referring now in specific detail to the drawings in which like reference numerals identify similar or identical elements throughout the several views, and initially to FIGS. 1, 2 and 3. The schematic diagram 100 of FIG. 1 is an exemplary embodiment of a retail establishment environment in which the inventive high-speed dual layer downloadable digital versatile disc D-DVD replication for replicating media objects (e.g., DVD's) can be utilized. The exemplary retail embodiment of FIG. 1 is merely illustrative of an application of the inventive multi-speed multi-layer optical disc recording method and other retail or recording environments are contemplated. FIG. 2 is block diagram 200 of a high-speed dual-layer parallel track path (PTP) method and FIG. 3 is block diagram 300 of an high-speed dual-layer opposite track path (OTP) method, for use in the retail establishment of FIG. 1.

The invention is an improved method for high-speed replication to dual layer media through use of a recording device with two optical pickup heads. For single optical pickup recording, dual layer DVD recording can take approximately 15 minutes. With two optical pickup heads recording simultaneously, this time can be reduced to approximately 50% or eight minutes. The two optical pickup heads are used to simultaneously record both layers of dual layer media, thus significantly reducing recording time by a factor of two. The optical pickup heads are collocated at the same recording radius, thus allowing for the recording of linear velocities and associated data rates for each layer to be equal and synchronized.

In the case of a Parallel Track Path recording 300, the data bit streams are synchronously streamed to the media to accomplish the simultaneous recording of both layers 2062. To accomplish parallel and simultaneous recording for Opposite track path format, the data stream is re-ordered such that the data stream is fed to the Layer 1 recording head in a backwards or first-in last-out orientation 106. After the final DVD formatting process step called eight-to-sixteen modulation 104, the data is re-ordered in a backwards or first-in last-out orientation through a software algorithm running on a PC or through hardware implementation. The reordered data stream is buffered for output to the Layer 1 recording head. The fully processed Layer 0 data stream and the fully processed Layer 1 re-ordered data stream are synchronously streamed to the two optical pickup heads for simultaneous recording of the two layers of DVD Dual Layer media 2061.

Referring now to the diagram 100 of FIG. 1, a content owner 12 prepares audio, video, navigation flowcharts, graphics and other ancillary information 14 that is to be included in final downloadable DVD (D-DVD) and transfers to compression and authoring facility.

An authoring and compression facility 19 performs compression of audio and video 18. Menus, subtitles and other ancillary information are configured for Dual Layer DVD and final navigational programming performed. Optional anti-copy or anti-rip programming 20 is added to content and final file set prepared for delivery to D-DVD processing center. Two master files are outputted, each representing one of the two layers of a dual layer DVD-Video disc.

The dual layer content is received at a D-DVD processing center 22. The processing center can be at a DVD replication, compression and authoring facility or other facility that is licensed to perform Content Scrambling System (CSS) copy protection encryption 24. The following steps take place in the processing center. As with normal replication processing, the processing center chooses CSS Disc Keys for delivery to the DVD CCA 25 for encryption based on CSS key encryption 28 and master key 26 information and subsequent return to processing center. The encrypted disc key 28 is used to encrypt the disc title key 30. After the content encrypted by the title key, the title key gets encrypted by the disc key and then the disc key gets encrypted. (Note: CSS or other types of encryption are optional). The data is then broken into sectors, the sectors (up to 50%) are then CSS scrambled 34, and DVD formatted 32. DVD error detection codes (EDC) and error correction codes (ECC) 36 are then generated.

The normal DVD encoding process would now transform the eight-bit data bytes into 16-bit words. The process is not performed at this stage to reduce the data file size and as an extra security function because these partially encoded and formatted DVD files are not directly usable to produce DVD-Video discs.

Lead-in data and lead-out data are then appended, to the data of each layer. Bit stream formatting is used to prepare the resultant eight-bit bytes into a downloadable DVD bit stream 38. The downloadable DVD bit stream is then transferred to hard disc for storage. Layer 0 and layer 1 of the downloadable DVD bit stream data files are then archived to suitable media for delivery to a central package processing and server center.

The dual layer DVD content formatting process is identical to that used in normal DVD-Video replication processes except the elimination of the final eight-to-sixteen modulation process and the downloadable DVD Bit stream formatting process. The layer 0 and layer 1 of the downloadable DVD bit stream archived data files are delivered to the Package Processing and Server Center (PPSC) 49.

The PPSC performs the following functions: The complete downloadable DVD bit stream packages are created by adding the disc label artwork, the collateral material artwork and other package information 46 to the layer 0 and layer 1 of the downloadable DVD Bit stream data files 202, 203 (see FIGS. 2 and 3). The downloadable DVD bit stream package is encrypted with suitable secondary encryption 48, stored in the bit stream package library server system 40 and archived to a suitable medium. This secondary encryption would be any encryption other than CSS encryption.

The PPSC system performs authentication 50, ancillary data management, transaction control 52, transaction record management 52, in-store library downloadable DVD bit stream package management 40 and package transfer 42. For in-store replication (or on-line retailer) a Secure Authenticated Channel high-speed connection is utilized for downloadable DVD bit stream package file management.

The PPSC also pre-loads the servers that are utilized for mass storage in the in-store downloadable DVD production systems in the retail environment with the appropriate bit stream library 40 prior to delivery to the retailer.

Proprietary dual layer and recordable DVD media is produced by a recordable media manufacturer. The recordable media manufacturer can provide downloadable DVD disc authentication and lot number creation 76 and downloadable DVD dual layer disc manufacturing and testing 75. The media would be manufactured to a proprietary specification with the following characteristics: The dual layer disc is produced using a proprietary pre-groove format that is different than that used in industry standard DVD recordable media. The proprietary format would be used to identify this media as downloadable DVD media in a downloadable DVD recording drive. The downloadable DVD recording drive is only capable of recording to this media and this media will not function on industry standard DVD burners such as those used in PC or set top box DVD burners.

The pre-groove may be encoded to contain disc authentication, lot number, store number and other information. Other identification/serialization information can be added to media by use of burst cutting area (BCA) or other means.

The in-store environment 120, such as a retailer or etailer (electronic retailer), contains the following subsystems and performs the following functions. A Transaction Manager 82 which houses the Bit stream Package Library 62 server performs inventory management 84, incoming package receipt 86, authentication and ancillary data management 88, transaction control and transaction record management 90 and manages the Secure Authenticated Channel for communication with the PPSC 49. Kiosks 92, terminals or Internet interfaces are used for content search and transaction functionality.

A multi-head, downloadable DVD disc burner/printer engine (DDBP) 94 is interfaced to the Transaction Manager 82. The DDBP 94 contains the following subsystems and performs the following functions. The subsystems include a proprietary downloadable DVD disc reading/recording drive 95 with two or more independent optical pickup heads, a disc printing engine 96, a PC 210 with preferably bit stream hard disc storage capacity 204, hardware subsystems and communication channel to the Transaction Manager.

A dual layer disc order is transferred to the DDBP and dual layer disc media 72 is transferred to the disc drive. This media is then read, confirmed to be Dual Layer DVD media, authentication and serialization data is then read from the disc for transfer through the authentication/Ancillary Data Management Subsystem 97 hardware to the "Transaction Manager" for final authentication from the PPSC.

Upon authentication the selected content (encrypted downloadable DVD bit stream package) is then transferred to the DDBP for decryption 98 in software in the controlling PC or through dedicated hardware. The output is the layer 0 and layer 1 downloadable DVD Bit streams 202, 203, label artwork, and collateral material artwork. The controlling PC or dedicated hardware 210 performs the final eight-to-sixteen modulation step 104 to the layer 0 and layer 1 downloadable DVD bit streams.

In the case of parallel track path dual layer content, see FIG. 3, the layer 0 and layer 1 data outputs from the eight-to-sixteen modulation step 104 are transferred to a PC or hardware based storage buffers 102, 103 for simultaneous synchronized first-in first-out (FIFO) streaming of both layer 0 and layer 1 bit streams to the dual-optical pickup head optical disc recorder 95, 2062. The Layer 0 bit stream is routed to the layer 0 optical pickup head and the layer 1 bit stream is routed to the layer 1 optical pickup head.

In the case of opposite track path dual layer content, see FIG. 2, the layer 1 output from the eight-to-sixteen modulation step 104 is re-ordered such that the bit stream is reversed in order making the ordering first-in last-out (FILO) 106. The re-ordering function takes the fully encoded bit stream and reverses the order in which it is stored in memory or other dedicated hardware. The data pattern is an exact mirror image of the original bit stream, only being reversed in order. The layer 0 data output from the eight-to-sixteen modulation step and the re-ordered layer 1 data output from the re-ordering step are transferred to a PC or hardware based storage buffers 102, 106 for simultaneous synchronized first-in first-out (FIFO) streaming of both layer 0 and layer 1 bit streams to the dual-head optical disc recorder 95, 2061. The layer 0 Bit stream is routed to the layer 0 optical pickup head and the re-ordered layer 1 Bit stream is routed to the layer 1 optical pickup head.

The dual-optical pickup head optical disc recorder receives the fully processed layer 0 and layer 1 downloadable DVD Bit streams. The layer 0 and layer 1 Bit streams are simultaneously and synchronously recorded to the layer 0 and layer 1 disc layers respectively, recording from the inner most data zone diameter to the outer most data zone diameter of the dual layer downloadable DVD disc 2061. The recorded disc is then a pre-recorded disc with identical characteristics to that of a normally replicated dual layer DVD-Video read only disc. This disc cannot be further recorded or altered.

After completion of recording the disc many be verified or partially verified, using both optical pickup heads, to ensure proper content and quality characteristics. The disc is then transferred to the disc printing engine 96 for decoration. Collateral paperwork is then printed and the final product is assembled into package for delivery to the consumer.

Having described preferred embodiments for dual layer DVD recording (which are intended to be illustrative and not limiting), it is noted that modifications and variations can be made by persons skilled in the art in light of the above teachings. The invention has applicability towards other optical disc formats such as high definition digital versatile disc HD DVD and Blu-ray or any other optical disc format that contains multiple layers that may contain data formatted in a parallel track path or opposite track path structure. Additionally, the technique may be applied to the recording of layer 1 of a dual layer disc using a single optical pickup head. The recording time or process of layer 1 of an OTP dual layer DVD disc may be improved by recording the layer 1 data in the reordered condition such that recording from the inner diameter to the outer diameter can be accomplished. The invention can also be used to verify a recorded dual layer disc for disc quality and data accuracy by checking both or all layers simultaneously using multiple optical pickup heads. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

The invention claimed is:

1. An apparatus comprising:
a recorder having at least two optical pickup heads for simultaneously recording at least two bit streams on respective layers of recordable media in one of an opposite track path and a parallel track path wherein for the opposite track path one of the two bit streams is recorded as a first-in first-out bit stream while the other of the two bit streams is recorded as a first-in last-out bit stream.

2. The apparatus of claim 1, wherein for the opposite track path the at least two bit streams are recorded on distinct layers of the recordable media for playback in opposite directions with respect to a radius of the recordable media.

3. The apparatus of claim 1, wherein the bit stream recorded as a first-in last-out bit stream is reversed in order prior to being recorded on its respective layer of the recordable media.

4. The apparatus of claim 1, wherein for the parallel track path the at least two bit streams are recorded on distinct layers of the recordable media for play back from the inner radius to the outer radius of the recordable media.

5. The apparatus as recited in claim 1, wherein the recorder is a dual optical pickup head recorder and the recordable media is dual layer digital versatile disc recordable media.

6. The apparatus of claim 1, wherein the recorder is configured for having the bit streams and a rotation frequency of the recordable media synchronized by having both optical pickup heads recording at the same radius for both layers.

7. The apparatus of claim 1, wherein the recorder records in a constant linear velocity mode with a data clock frequency remaining constant and rotation clock frequency varying as a function of radius.

8. The apparatus of claim 1, wherein the recorder records in a constant angular velocity mode with a data clock frequency varying as a function of radius and rotation clock frequency remaining constant.

9. A method comprising the step of:
recording at least two bit streams simultaneously on respective layers of recordable media in one of an opposite track path and a parallel track path, wherein for the opposite track path one of the two bit streams is recorded as a first-in first-out bit stream while the other of the two bit streams is recorded as a first-in last-out bit stream.

10. The method of claim 9, wherein for the opposite track path the at least two bit streams are recorded on distinct layers of the recordable media for play-back in opposite directions with respect to a radius of the recordable media.

11. The method of claim 9, wherein the bit stream recorded as a first-in last-out bit stream is reversed in order prior to being recorded on its respective layer of the recordable media.

12. The method of claim 9, wherein for the parallel track path the at least two bit streams are recorded on distinct layers of the recordable media for play back from the inner radius to the outer radius of the recordable media.

13. The method of claim 9, further comprising the step of converting the at least two bit streams from an eight-to-sixteen bit modulation prior to the step of recording at least two bit streams simultaneously on respective layers of recordable media.

14. The method of claim 9, further comprising the step of synchronously streaming the at least two bit streams as distinct bit stream layers for the step of recording the at least two bit streams simultaneously on respective layers of recordable media.

15. The method of claim 9, wherein the recording is configured for having the bit streams and a rotation frequency of the recordable media synchronized by having both optical pickup heads recording at the same radius for both layers.

16. The method of claim 9, wherein the recording is recorded in a constant linear velocity mode with a data clock frequency remaining constant and rotation clock frequency varying as a function of radius.

17. The method of claim 9, wherein the recording is recorded in a constant angular velocity mode with a data clock frequency varying as a function of radius and rotation clock frequency remaining constant.

18. An apparatus comprising:
a recorder having at least two optical pickup heads for simultaneously recording at least two bit streams on respective layers of recordable media in an opposite track path, wherein for the opposite track path one of the two bit streams is reversed in order prior to being recorded on its respective layer of the recordable media.

19. The apparatus of claim 18, wherein for the opposite track path the at least two bit streams are recorded on distinct layers of the recordable media for playback in opposite directions with respect to a radius of the recordable media.

20. The apparatus of claim 18, wherein for the opposite track path one of the two bit streams is recorded as a first-in first-out bit stream while the other of the two bit streams is recorded as a first-in last-out bit stream.

21. The apparatus as recited in claim 18, wherein the recorder is a dual head recorder and the recordable media is dual layer digital versatile disk recordable media.

22. The apparatus of claim 18, wherein the recorder is configured for having the bit streams and a rotation frequency of the recordable media synchronized by having both optical pickup heads recording at the same radius for both layers.

23. The apparatus of claim 18, wherein the recorder records in a constant linear velocity mode with a data clock frequency remaining constant and rotation clock frequency varying as a function of radius.

24. The apparatus of claim 18, wherein the recorder records in a constant angular velocity mode with a data clock frequency varying as a function of radius and rotation clock frequency remaining constant.

25. A method comprising the step of:
recording at least two bit streams simultaneously on respective layers of recordable media in an opposite track path, wherein the step of recording includes that one of the bit streams recorded is reversed in order prior to being recorded on its respective layer of the recordable media.

26. The method of claim 25, wherein the recording step includes recording the at least two bit streams on distinct layers of the recordable media for playback in opposite directions with respect to a radius of the recordable media.

27. The method of claim 24, wherein the step of recording includes recording one of the two bit streams as a first-in first-out bit stream while the other of the two bit streams is recorded as a first-in last-out bit stream.

28. The method of claim 25, further comprising the step of converting the at least two bit streams from an eight-to-sixteen bit modulation prior to the step of recording at least two bit streams simultaneously on respective layers of recordable media.

29. The method of claim 25, further comprising the step of synchronously streaming the at least two bit streams as distinct bit stream layers for the step of recording the at least two bit streams simultaneously on respective layers of recordable media.

30. The method of claim 25, wherein the recording is configured for having the bit streams and a rotation frequency of the recordable media synchronized by having both optical pickup heads recording at the same radius for both layers.

31. The method of claim 25, wherein the recording is recorded in a constant linear velocity mode with a data clock frequency remaining constant and rotation clock frequency varying as a function of radius.

32. The method of claim 25, wherein the recording is recorded in a constant angular velocity mode with a data clock frequency varying as a function of radius and rotation clock frequency remaining constant.

* * * * *